\n

(12) United States Patent
Hansson et al.

(10) Patent No.: US 8,082,933 B2
(45) Date of Patent: Dec. 27, 2011

(54) VESSEL AND METHODS FOR CALIBRATING, CLEANING OR REMOVING AN IMPLEMENT LOCATED IN SUCH A VESSEL OR INSERTING AN IMPLEMENT INTO SUCH A VESSEL

(75) Inventors: Peder Hansson, Jar (NO); Erik Bjørklund, Oslo (NO)

(73) Assignee: Hamworthy PLC, Poole (GB)

( * ) Notice: Subject to any disclaimer, the term of this patent is extended or adjusted under 35 U.S.C. 154(b) by 874 days.

(21) Appl. No.: 12/003,751

(22) Filed: Dec. 31, 2007

(65) Prior Publication Data
US 2008/0173334 A1 Jul. 24, 2008

(30) Foreign Application Priority Data
Dec. 29, 2006 (NO) .................................. 20066065

(51) Int. Cl.
*B08B 3/04* (2006.01)
*B08B 13/00* (2006.01)
(52) U.S. Cl. ....................................... 134/200; 210/739
(58) Field of Classification Search .................. 137/577, 137/565.01, 590; 210/270, 407, 170.08, 210/171, 332, 513, DIG. 5, 739; 134/200
See application file for complete search history.

(56) References Cited

U.S. PATENT DOCUMENTS

| | | | |
|---|---|---|---|
| 3,538,745 A | | 11/1970 | Wright et al. |
| 3,606,985 A | | 9/1971 | Reed |
| 4,307,741 A | * | 12/1981 | Rossi ......................... 134/100.1 |
| 4,385,936 A | * | 5/1983 | Rossi ............................... 134/18 |
| 4,489,590 A | * | 12/1984 | Hadden .......................... 73/1.04 |
| 4,794,804 A | * | 1/1989 | Ishii ............................... 73/865.6 |
| 6,131,473 A | * | 10/2000 | Hoffman et al. ............. 73/866.5 |
| 6,773,678 B2 | * | 8/2004 | Cummings et al. ........... 422/560 |
| 7,325,555 B2 | * | 2/2008 | Caderas ...................... 134/64 R |

FOREIGN PATENT DOCUMENTS
DE 34 35 258 A1 4/1986
WO WO 2005/100200 A1 10/2005

OTHER PUBLICATIONS

Norwegian Search Report, dated May 27, 2008, Issued on Counterpart Norwegian Application No. 20066065.
UK Search Report, dated Apr. 8, 2008, Issued on Counterpart Great Britain Application No. GB0725275.2.

\* cited by examiner

*Primary Examiner* — Duane Smith
*Assistant Examiner* — Paul J Durand
(74) *Attorney, Agent, or Firm* — Venable LLP; Eric J. Franklin

(57) ABSTRACT

A vessel having an implement located in a fluid receiving space inside the vessel. The vessel includes an enclosure for enclosing a closed space around the implement. An actuator actuates the enclosure to and fro between an open position, in which the enclosure does not enclose a closed space around the implement, and a closed position, in which the enclosure forms a fluid tight or at least essentially fluid tight casing that encloses a closed space around the implement so as to prevent fluid in the fluid receiving space outside the closed space from flowing into the closed space. A method for cleaning and/or calibrating an implement located in a fluid receiving space inside such a vessel and a method for removing an implement from or inserting an implement into a fluid receiving space inside a vessel.

11 Claims, 4 Drawing Sheets

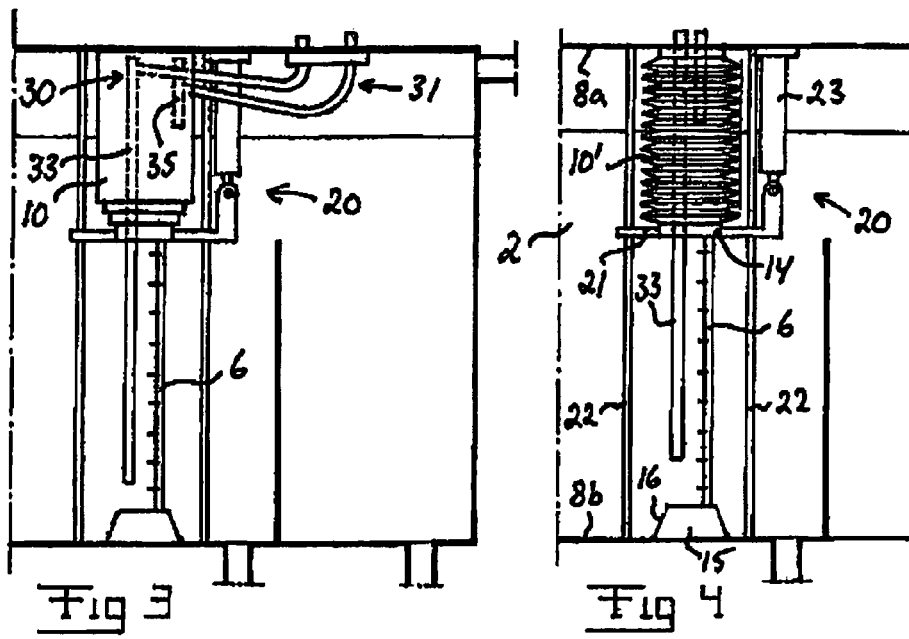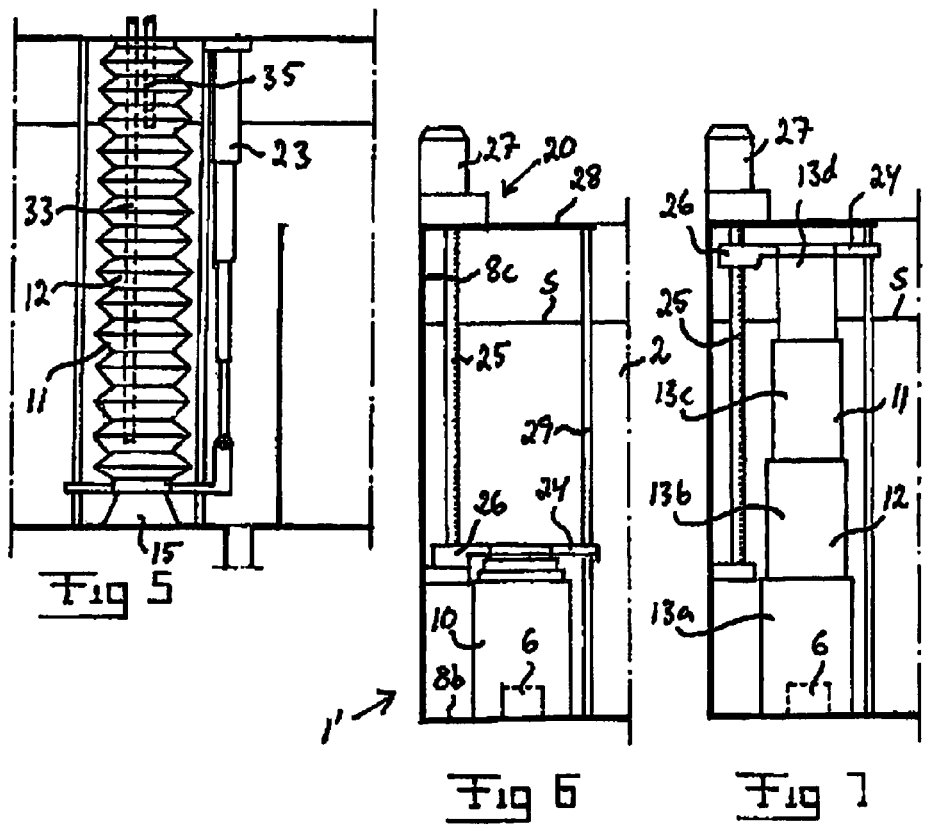

VESSEL AND METHODS FOR CALIBRATING, CLEANING OR REMOVING AN IMPLEMENT LOCATED IN SUCH A VESSEL OR INSERTING AN IMPLEMENT INTO SUCH A VESSEL

FIELD OF THE INVENTION AND PRIOR ART

The present invention relates to a vessel. The invention also relates to a method for calibrating a measuring or detecting instrument located in a fluid receiving space inside a vessel. Furthermore, the invention relates to a method for cleaning an implement located in a fluid receiving space inside a vessel. The invention also relates to a method for removing an implement from or inserting an implement into a fluid receiving space inside a vessel.

In this description and the subsequent claims, the term "vessel" refers to any type of fluid accommodating object having a fluid receiving space for accumulating, treating or conveying fluid. The vessel may for instance be a separator tank, a pipe or a pipe section. Application areas for the invention are typically in a topside separator offshore or onshore or in a subsea plant for extraction and/or processing of well fluid in the form of hydrocarbons, water etc. Such well fluid normally includes a mixture of oil, water and gas. The invention can also be applied to other process or production systems, for example in the chemical industry, the petrochemical industry (refineries etc.), the pharmaceutical and food industry (dairies etc.), the pulp and paper industry and the metal and mineral industry, or any other process or production industry.

A vessel for treating and/or conveying fluid is often provided with an implement which is used in the process of treating and/or conveying the fluid and which is located in a fluid receiving space inside the vessel in contact with the fluid to be treated and/or conveyed. The implement may for instance be a measuring or detecting instrument, a valve, a pump, a hydraulic or electric motor or an electrostatic device. The implement may be subjected to dirtying by the surrounding fluid, which might have a negative effect on the performance of the implement. In such a case, there is a need to clean the implement at repeated occasions. Normally, the implement also has to be subjected to maintenance, repair and/or replacement in course of time due to ageing or malfunction. In case of a measuring or detecting instrument, there might also be a need to calibrate the instrument at repeated occasions due to the effects of drift in the electronics and/or ageing thereof.

The execution of any of the above-mentioned measures on an implement located in a fluid receiving space inside a vessel will normally require that the treating and/or conveying of the fluid is interrupted and that the fluid receiving space is emptied of fluid, which may take a lot of time and negatively influence the productivity of the system of which the vessel forms part.

SUMMARY OF THE INVENTION

The object of the present invention is to create improved opportunities for efficiently handling an implement located in a fluid receiving space inside a vessel.

According to a first aspect of the invention, the object is achieved by a vessel.

The inventive vessel includes:
- an implement located in a fluid receiving space inside the vessel;
- an enclosing device for enclosing a closed space around the implement; and
- actuating means for actuating the enclosing device to and fro between an open position, in which the enclosing device does not enclose a closed space around the implement, and a closed position, in which the enclosing device forms a fluid tight or at least essentially fluid tight casing that encloses a closed space around the implement so as to prevent fluid in the fluid receiving space outside the closed space from flowing into the closed space.

In this description and the subsequent claims, the expression "closed space" refers to a space that is partitioned off from the rest of the fluid receiving space inside the vessel in such a manner that fluid in the fluid receiving space outside the closed space is prevented from flowing into the closed space through the casing formed by the enclosing device.

Thus, the enclosing device makes it possible to delimit a closed space around the implement, whereupon the implement may be subjected to any of the above-mentioned measures without having to empty the fluid receiving space inside the vessel and without having to interrupt the normal treating and/or conveying of the fluid in the fluid receiving space.

According to an embodiment of the invention, the vessel includes fluid supplying means for supplying a desired fluid into the closed space and fluid discharging means for discharging fluid out of the closed space. Hereby, it will for instance be possible to clean the implement by supplying flushing fluid into the closed space, and to calibrate an implement in the form of a measuring or detecting instrument by supplying calibration fluid with known characteristics into the closed space.

According to another embodiment of the invention, the enclosing device, which may have the form of a telescopically extendable cylinder or an extendable bellows, is fixed to an upper wall of the fluid receiving space and arranged to be extended from this upper wall downwards through the fluid receiving space when actuated from the open position to the closed position. Hereby, heavier components of the fluid in the fluid receiving space will be prevented from being deposited on or inside the enclosing device when it is in the contracted state.

According to another embodiment of the invention, the enclosing device has a rim at its lower end and a socket is fixed to a bottom wall of the fluid receiving space under the enclosing device, the socket having a beveled surface that forms a mating surface for the rim of the enclosing device when the enclosing device is in the closed position so as to allow the rim of the enclosing device to abut against the mating surface of the socket in a fluid tight or at least essentially fluid tight manner when the enclosing device is in the closed position. The beveled surface of the socket prevents solid components of the fluid in the fluid receiving space, such as for instance sand, from being deposited on the mating surface for the rim of the enclosing device. Hereby, no depositions of solid fluid components will be allowed to hinder a fluid tight connection between the enclosing device and the socket when the enclosing device is brought into the closed position.

Further embodiments and advantages of the inventive vessel will appear from the following description and the dependent claims.

According to a second aspect of the invention, the object is achieved by a method for calibrating an implement in the form of a measuring or detecting instrument located in a fluid receiving space inside a vessel. This inventive method includes the steps of:

a) actuating an enclosing device from an open position, in which the enclosing device does not enclose a closed space around the instrument, to a closed position, in which the enclosing device forms a fluid tight or at least essentially fluid tight casing that encloses a closed space around the instrument so as to prevent fluid in the fluid receiving space outside the closed space from flowing into the closed space;

b) discharging fluid out of the closed space;

c) supplying calibration fluid with known characteristics into the closed space;

d) calibrating the instrument based on one or several measuring or detecting operations performed by the instrument on the calibration fluid; and e) actuating the enclosing device from the closed position to the open position so as to allow fluid in the fluid receiving space to come into contact with the instrument.

With this method, the instrument is brought into contact with a calibration fluid with known characteristics so as to thereby calibrate the instrument without having to empty the fluid receiving space inside the vessel and without having to interrupt the normal treating and/or conveying of the fluid in the fluid receiving space. The instrument may be formed of or include one or several sensors, probes or detectors.

When the vessel is a separator tank the calibration fluid or fluids can preferably be the separated phases taken from somewhere downstream in the process. In this manner, a direct measurement of the instrument's response to these phases is achieved. In an example of a reactor or other processing vessel in which various components are to be mixed, and where the instrument monitors e.g. fractions of the various components, the different calibration fluids can be the individual components taken from somewhere upstream in the process.

The instrument is preferably cleaned between the execution of the above-mentioned steps b) and c) by supplying flushing fluid into the closed space and discharging the flushing fluid out of the closed space a suitable number of times or for a suitable period of time.

According to a third aspect of the invention, the object is achieved by a method for cleaning an implement located in a fluid receiving space inside a vessel. This inventive method includes the steps of:

A) actuating an enclosing device from an open position, in which the enclosing device does not enclose a closed space around the implement, to a closed position, in which the enclosing device forms a fluid tight or at least essentially fluid tight casing that encloses a closed space around the implement so as to prevent fluid in the fluid receiving space outside the closed space from flowing into the closed space;

B) discharging fluid out of the closed space;

C) supplying flushing fluid into the closed space and discharging the flushing fluid out of the closed space a suitable number of times or for a suitable period of time; and D) actuating the enclosing device from the closed position to the open position so as to allow fluid in the fluid receiving space to come into contact with the implement.

With this method, the implement is flushed with a flushing fluid so as to thereby clean the implement without having to empty the fluid receiving space inside the vessel and without having to interrupt the normal treating and/or conveying of the fluid in the fluid receiving space.

According to a fourth aspect of the invention, the object is achieved by a method for removing an implement from or inserting an implement into a fluid receiving space inside a vessel. This inventive method includes the steps of:

actuating an enclosing device from an open position, in which the enclosing device does not enclose a closed space inside the fluid receiving space, to a closed position, in which the enclosing device forms a fluid tight or at least essentially fluid tight casing that encloses a closed space inside the fluid receiving space so as to prevent fluid in the fluid receiving space outside the closed space from flowing into the closed space;

gaining access to the closed space by uncovering an access opening provided in a wall of the fluid receiving space; and removing the implement from or inserting the implement into the closed space inside the fluid receiving space via the access opening.

With this method, the implement is removed from or inserted into the fluid receiving space without having to empty the fluid receiving space inside the vessel and without having to interrupt the normal treating and/or conveying of the fluid in the fluid receiving space.

BRIEF DESCRIPTION OF THE DRAWINGS

With reference to the appended drawings, a specific description of preferred embodiments of the invention cited as examples follows below. In the drawings:

FIG. 3 is a schematic illustration of a part of a vessel according to another embodiment of the invention, as seen in a longitudinal section, with an enclosing device shown in open position, FIG. 4 is a schematic illustration of a part of a vessel according to another embodiment of the invention, as seen in a longitudinal section, with an enclosing device shown in open position, FIG. 5 shows the enclosing device of FIG. 4 in closed position, FIG. 6 is a schematic illustration of a part of a vessel according to another embodiment of the invention, as seen in a longitudinal section, with an enclosing device shown in open position, FIG. 7 shows the enclosing device of FIG. 6 in closed position.

DETAILED DESCRIPTION OF PREFERRED EMBODIMENTS OF THE INVENTION

An inventive vessel will in the following be described as implemented in the form of a separator tank. However, the invention is in no way limited to this utilization. On the contrary, the inventive vessel may be any type of vessel for treating and/or conveying fluid, such as for instance any other type of closed or open tank, a pipe or a pipe section.

Figure 1:
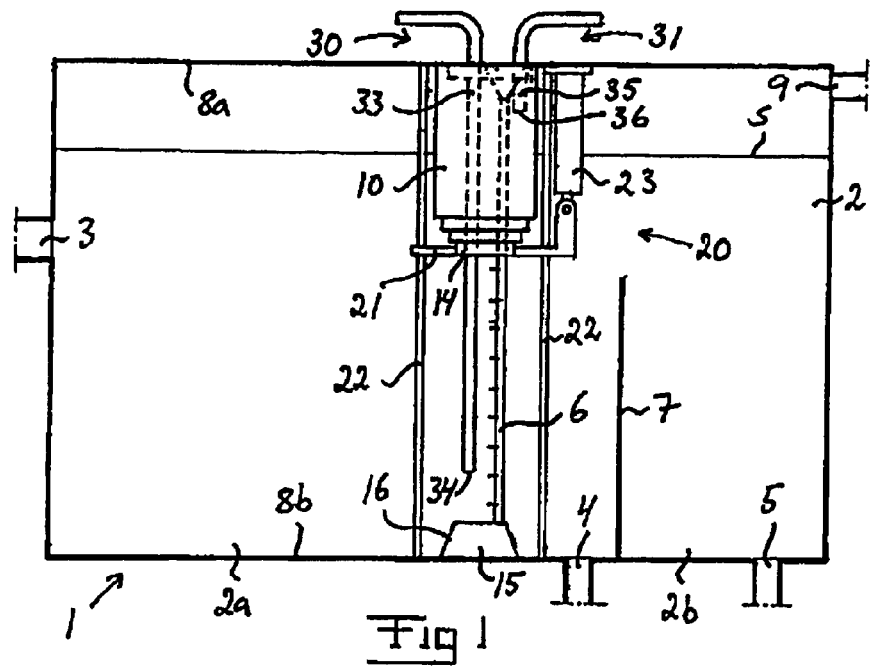
FIG. 1 is a schematic illustration of a vessel according to a first embodiment of the present invention, as seen in a longitudinal section, with an enclosing device shown in open position.
Figure 2:
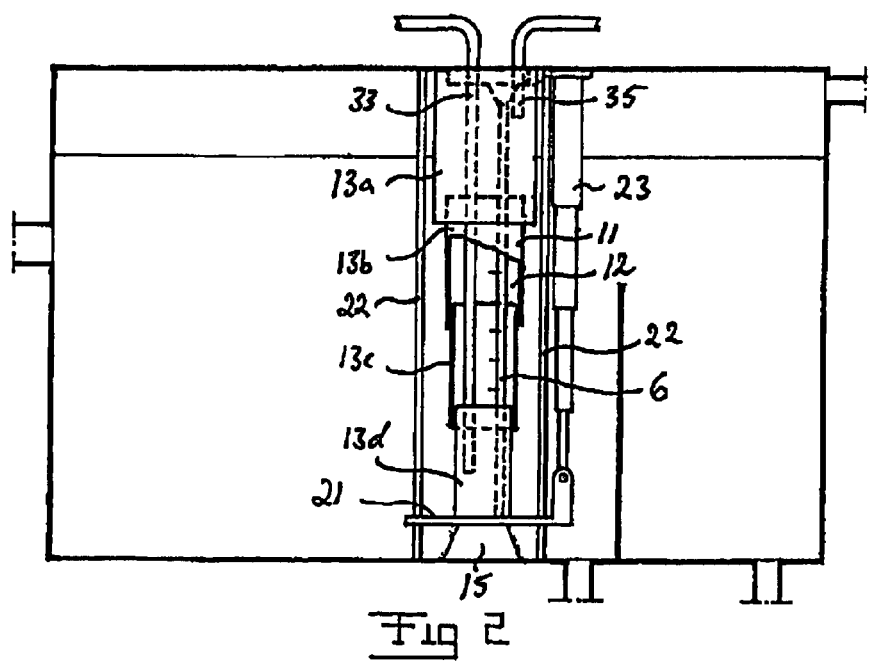
FIG. 2 shows the vessel of FIG. 1 with the enclosing device in closed position.

A vessel 1 according to a first embodiment of the present invention is illustrated in FIGS. 1 and 2. In the example illustrated in FIGS. 1 and 2, the vessel 1 is a gravity settling tank for separating different components of fluid in the form of an emulsion. The fluid may be well fluid emanating from a well, such as for instance an oil-water emulsion extracted from a well in an oil field. The vessel 1 includes:
- a fluid receiving space 2 for receiving fluid to be subjected to gravitational separation therein;
- an inlet 3, through which fluid is feed into the fluid receiving space 2;
- a first outlet 4 for discharging, from the fluid receiving space 2, a first fluid component that has been separated from the fluid in the fluid receiving space 2 under the action of gravity;
- a second outlet 5 for discharging, from the fluid receiving space 2, a second fluid component of the fluid or the remaining fluid from which at least a part of the first fluid component has been separated;
- a third outlet 9 for discharging gases from the fluid receiving space 2; and
- an implement 6 located in the fluid receiving space 2.

In the examples illustrated in FIGS. 1 and 2, the first outlet 4 is connected to a part 2a of the fluid receiving space that is separated from another part 2b of the fluid receiving space by a partition wall 7.

In the example illustrated in FIGS. 1 and 2, the implement 6 is a measuring instrument in the form of a measuring rod, which for instance may be designed to measure the concentration of a specific fluid component of the fluid received in the fluid receiving space 2 and/or a level of the fluid received in the fluid receiving space 2, such as for instance the level of the interface between water and oil of an oil-water emulsion and/or the level of the upper fluid surface S in the fluid receiving space.

The vessel 1 further includes an enclosing device 10 for enclosing a closed space around the implement 6, and actuating means 20 for actuating the enclosing device 10 to and fro between an open position, in which the enclosing device does not enclose a closed space around the implement (see FIG. 1), and a closed position, in which the enclosing device forms a fluid tight or at least essentially fluid tight casing 11 that encloses a closed space 12 around the implement so as to prevent fluid in the fluid receiving space 2 outside the closed space from flowing into the closed space (see FIG. 2).

The enclosing device 10 could be located entirely inside the fluid receiving space 2, as illustrated in FIGS. 1-7, but may alternatively be so arranged that it is located entirely or partly outside the fluid receiving space when it is in the open position.

In the embodiments illustrated in FIGS. 1, 2, 6 and 7 the enclosing device 10 has the form of a telescopically extendable cylinder, which is in a contracted state when the enclosing device is in the open position, as illustrated in FIGS. 1 and 6, and in an extended state when the enclosing device is in the closed position, as illustrated in FIGS. 2 and 7. The telescopically extendable cylinder encircles the above-mentioned implement 6 and includes several cylindrical parts 13a-13d, which are slidingly joined to each other. Sealing members (not shown) are provided between the cylindrical parts 13a-13d so as to form a fluid tight or at least essentially fluid tight sealing between parts 13a-13d located adjacent to each other when the telescopically extendable cylinder is in its extended state.

In the embodiment illustrated in FIGS. 1 and 2, the lower cylindrical part 13d is fixed to a holder 21, which is displaceable up-and-down along guiding rods 22 under the action of the actuating means 20 so as to allow the lower cylindrical part to be moved up-and-down between the upper wall 8a and bottom wall 8b of the fluid receiving space and thereby move the telescopically extendable cylinder between its contracted state and extended state. In the illustrated example, the actuating means 20 includes a hydraulic cylinder 23, which has a first end secured to the upper wall 8a of the fluid receiving space and a second end secured to the holder 21. In this case, the enclosing device 10 is moved between open and closed position and vice versa by the hydraulically produced extension and contraction, respectively, of the hydraulic cylinder 23.

In the embodiment illustrated in FIGS. 6 and 7, the upper cylindrical part 13d is fixed to a holder 24, which is connected to a treaded rod 25 via a nut 26 or a similar threaded member having an internal thread that engages with the external thread of the threaded rod 25. The threaded rod 25 is rotatable in opposite directions by means of a hydraulic or electric motor 27 and the nut 26, and thereby the upper cylindrical part 13d, is made to travel in a desired direction along the threaded rod 25 by rotation of the threaded rod 25 in either direction so as to thereby move the telescopically extendable cylinder between its contracted state and extended state. Thus, in this case, the motor 27 and the threaded rod 25 form part of the actuating means 20. In the illustrated example, the motor 27 is secured to a lateral wall 8c of the vessel 1 via a bracket 28. A guiding rod 29 is fixed between the bracket 28 and the bottom wall 8b of the fluid receiving space and serves as a guiding for the holder 24.

In the embodiment illustrated in FIGS. 4 and 5 the enclosing device 10' has the form of an extendable bellows, which is in a contracted state when the enclosing device is in the open position, as illustrated in FIG. 4, and in an extended state when the enclosing device is in the closed position, as illustrated in FIG. 5. The extendable bellows encircles the above-mentioned implement 6. In the illustrated example, the lower end of the bellows is connected to a holder 21 in the same manner as the lower cylindrical part 13d of the telescopically extendable cylinder of FIGS. 1 and 2 and is moveable by actuating means in a corresponding manner.

In the embodiments illustrated in FIGS. 1, 2, 4 and 5, the enclosing device 10, 10' is fixed to an upper wall 8a of the fluid receiving space 2 and arranged to be extended from this upper wall downwards through the fluid receiving space when actuated from the open position to the closed position. In this case, the casing 11 formed by the enclosing device 10, 10' in its closed position extends between the upper wall 8a and the opposite bottom wall 8b of the fluid receiving space 2 and surrounds the implement 6. The enclosing device 10, 10' has a rim 14 at its lower end and a socket 15 is fixed to the bottom wall 8b of the fluid receiving space 2 under the enclosing device. The socket 15 has a beveled surface 16 that forms a mating surface for the rim 14 of the enclosing device when the enclosing device 10, 10' is in the closed position so as to allow the rim 14 of the enclosing device to abut against the mating surface 16 of the socket in a fluid tight or at least essentially fluid tight manner when the enclosing device is in the closed position. In the illustrated example, the socket 15 has the shape of a truncated cone, the base of which being fixed to the bottom wall 8b of the fluid receiving space. The rim 14 and the beveled surface 16 may for instance be ring-shaped.

In the embodiment illustrated in FIGS. 6 and 7, the vessel 1' is a tank having an open top, which for instance may constitute a gravity settling tank for waste water treatment. In this case, the enclosing device 10 is fixed to the bottom wall 8b of the fluid receiving space 2 and arranged to be extended from this bottom wall upwards through the fluid receiving space when actuated from the open position (see FIG. 6) to the closed position (see FIG. 7). In this case, the upper part 13d of the enclosing device 10 is to extend above the fluid surface S in the fluid receiving space 2 when the enclosing device is in the closed position. When the enclosing device 10 is in the open position, fluid is allowed to flow into the enclosing device via the upper open end thereof so as to come into contact with the implement 6.

Figures 8, 9:
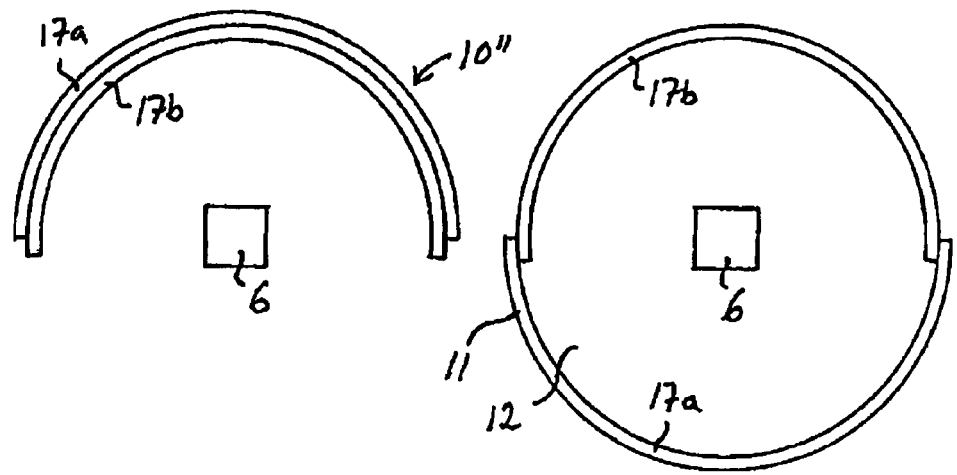
FIG. 8 is a schematic cross-sectional view of an alternative enclosing device in open position.
FIG. 9 shows the enclosing device of FIG. 8 in closed position.

According to an alternative embodiment, the enclosing device 10" is formed of two or more parallelly arranged casing parts 17a, 17b (see FIGS. 8 and 9), which are laterally displaceable in relation to each other by suitable actuating means to and fro between an open position, in which the casing parts 17a, 17b do not form a casing that encloses a closed space around an implement 6 (see FIG. 8), and a closed position, in which the casing parts 17a, 17b together form a fluid tight or at least essentially fluid tight casing 11 that encloses a closed space 12 around the implement. FIGS. 8 and 9 very schematically illustrate the principles of such an enclosing device 10". In the illustrated example, each casing part 17a, 17b has the shape of a semi-cylinder. These semi-cylindrical casing parts 17a, 17b are concentrically arranged and at least one of them is displaceable in relation to the other casing part about their common centre axis.

Figures 10, 11:
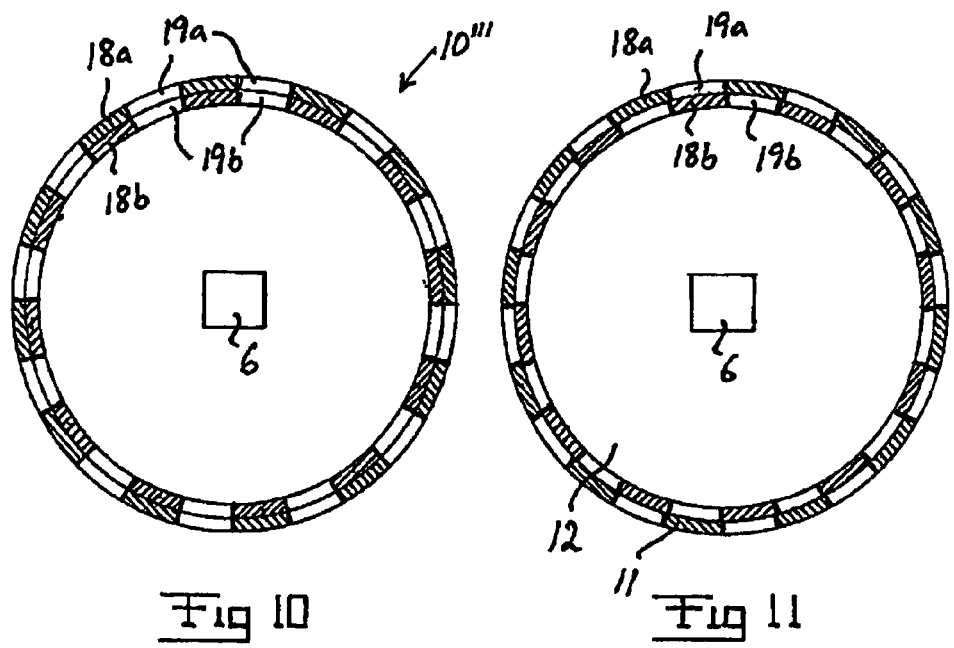
FIG. 10 is a schematic cross-sectional view of another alternative enclosing device in open position.
FIG. 11 shows the enclosing device of FIG. 10 in closed position.

FIGS. 10 and 11 very schematically illustrate an enclosing device 10''' according to another alternative embodiment. In this case, the enclosing device 10''' includes at least two coaxial tubes 18a, 18b provided with through openings 19a, 19b in their tube walls. At least one of the tubes 18a is displaceable in relation to the other tube 18b by means of suitable actuating means in such a manner that the through openings 19a of one of the tubes 18a overlap through openings 19b of the other tube 18b when the enclosing device is in the open position (see FIG. 10), so as to thereby form fluid passages extending through the walls of the tubes, and are covered by the tube wall of the other tube 18b when the enclosing device is in the closed position (see FIG. 11), so as to thereby close the fluid passages. The tubes 18a, 18b may be displaceable by rotation in relation to each other, as illustrated in FIGS. 10 and 11. The tubes 18a, 18b may alternatively be axially displaceable in relation to each other.

As a further alternative, the enclosing device may be formed of inflatable members, which are in a deflated state when the enclosing device is in the open position and in an inflated state when the enclosing device is in the closed position. When inflated, the inflatable members are pressed against each other so as to together form a fluid tight or at least essentially fluid tight casing. The inflatable members may for instance consist of inflatable rings arranged concentrically above each other, or of elongated members arranged in parallel with each other so as to form a cylindrical casing when inflated. In this case, the actuating means include means for supplying pressurized gas to the inflatable members.

Other alternative enclosing devices are also conceivable for use in a vessel according to the present invention.

An enclosing device of the type here in question may of course be arranged to form a casing about another type of implement than a measuring instrument, such as for instance an implement in the form of a detecting instrument, a valve, a pump, a motor or an electrostatic device.

The inventive vessel 1 is suitably provided with fluid supplying means 30 for supplying a desired fluid into the closed space 12 inside the casing 11 formed by the enclosing device 10, 10' in its closed position, and fluid discharging means 31 for discharging fluid out of the closed space. The fluid supplying means 30 may be connected to an external fluid source (not shown), i.e. a fluid source separated from the fluid receiving space 2 of the vessel, so as to be capable of supplying fluid into the closed space 12 from the external fluid source. Alternatively, the fluid supplying means 30 may be connected to a specific part of the fluid receiving space 2 so as to be capable of supplying fluid into the closed space 12 from this part of the fluid receiving space. In the latter case, if the vessel in question is a gravity settling tank for treating an oil-water emulsion, the fluid supplying means 30 may be connected to the bottom part of the fluid receiving space so as to be capable of supplying process water into the closed space 12.

In the embodiment illustrated in FIGS. 1 and 2, the fluid supplying means 30 includes a conduit 33 having an outlet 34 located at the lower part of the closed space 12 inside the casing 11 formed by the enclosing device 10 in its closed position, whereas the fluid discharging means 31 includes a conduit 35 having an inlet 36 located at the upper part of the closed space 12. The conduits 33, 35 of the fluid supplying means 30 and the fluid discharging means 31 may be connected to a penetrator arranged in an external wall of the vessel 1 in an area located inside the enclosing device 10, as illustrated in FIGS. 1 and 2, or in an area located outside the enclosing device 10, as illustrated in FIG. 3.

When the enclosing device 10 of the vessel 1 is in the closed position, the fluid supplying means 30 and fluid discharging means 31 may be used for cleaning an implement 6 located in the closed space 12 that is enclosed by the enclosing device in the closed position. In this case, the fluid discharging means 31 are actuated to discharge fluid out of the closed space 12, and the fluid supplying means 30 are simultaneously actuated to supply flushing fluid, for instance in the form of water, into the closed space 12. Flushing fluid is then supplied into and discharged out of the closed space a suitable number of times or for a suitable period of time, until the implement 6 is considered to be sufficiently clean. Subsequently, the enclosing device 10 is returned to the open position so as to allow the cleaned implement 6 to be put back into operation.

When the enclosing device 10 of the vessel 1 is in the closed position, the fluid supplying means 30 and fluid discharging means 31 may also be used for calibrating an implement 6 in the form of a measuring or detecting instrument located in the closed space 12 that is enclosed by the enclosing device in the closed position. In this case, the fluid discharging means 31 are actuated to discharge fluid out of the closed space 12, and the fluid supplying means 30 are simultaneously actuated to supply calibration fluid with known characteristics into the closed space 12. The instrument is then calibrated based on one or several measuring or detecting operations performed by the instrument on the calibration fluid. Subsequently, the enclosing device 10 is returned to the open position so as to allow the calibrated instrument 6 to be put back into operation.

If so necessary, the instrument 6 may be cleaned by means of flushing fluid in the above-mentioned manner before being subjected to calibration by means of calibration fluid.

Figure 12:
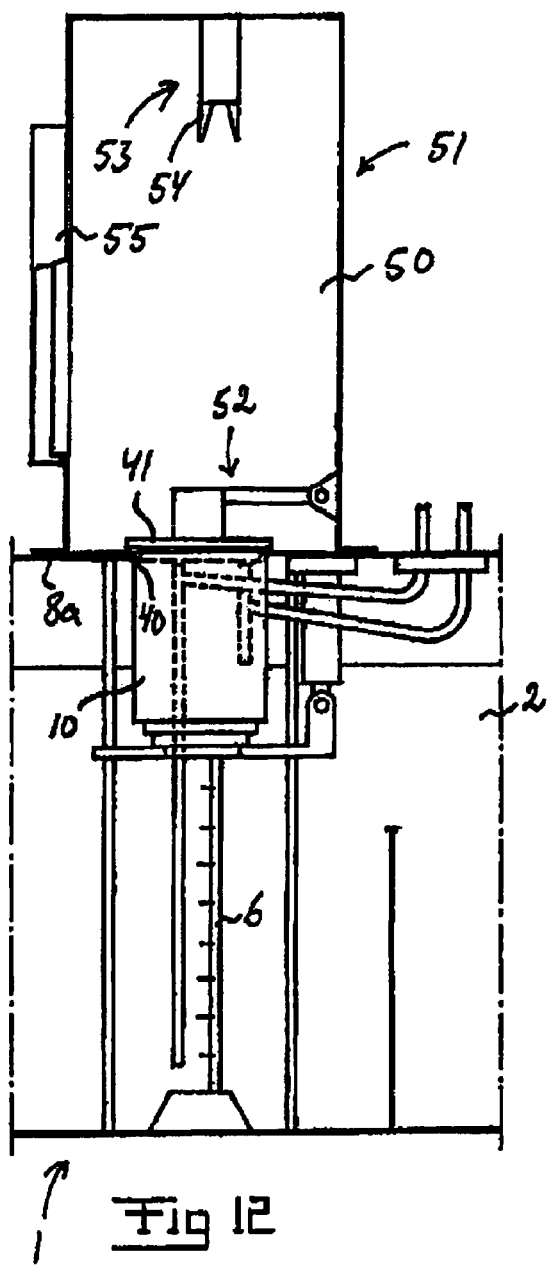
FIG. 12 is a schematic illustration of a part of a vessel according to another embodiment of the invention, as seen in a longitudinal section, with an enclosing device shown in open position.
Figure 13:
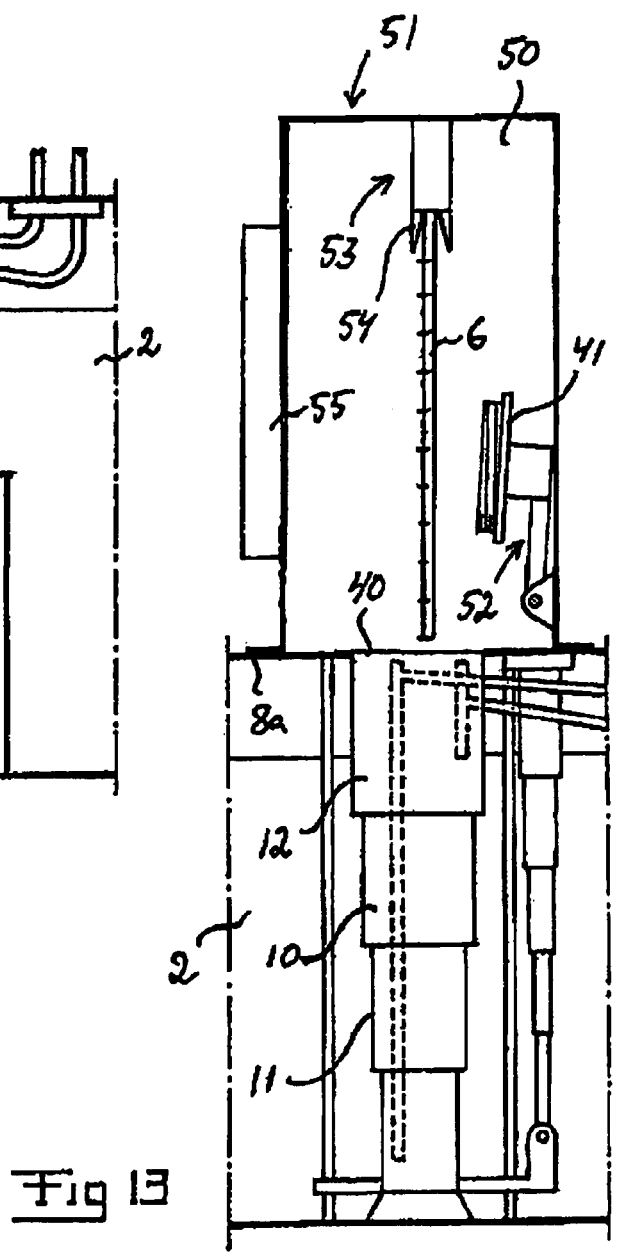
FIG. 13 shows the vessel of FIG. 12 with the enclosing device in closed position and with the implement removed from its normal location.

In the embodiment illustrated in FIGS. 12 and 13, the vessel 1 is provided with a closable access opening 40 arranged in the upper wall 8a of the fluid receiving space 2. The implement 6 is accessible through this access opening 40 when the enclosing device 10 is in the closed position and the access opening 40 is uncovered. The access opening 40 may be closable by means of any suitable closing member, such as a hatch, a lid etc. In the illustrated example, the access opening 40 is closable by means of a closing member 41 in the form of a hatch, which may be secured in the access opening 40 in any suitable manner, for instance by screwing.

The access opening 40 may be arranged to open directly to the surroundings when the closing member 41 is made to uncover the access opening. However, when the vessel 1 is arranged in for example a subsea plant, the access opening 40 is suitably arranged to open into an inner space 50 of a buffer tank 51 when the closing member 41 is made to uncover the access opening, as illustrated in FIGS. 12 and 13. In this case, the implement 6 can be transferred from the closed space 12 inside the enclosing device 10 into the inner space 50 of the buffer tank 51 or transferred from the inner space 50 of the buffer tank 51 into the closed space 12 inside the enclosing device 10. During this transfer, the inner space 50 of the buffer tank 51 is in fluid communication with the closed space 12 inside the enclosing device 10 via the uncovered access opening 40 and separated from the surroundings. Thus, the enclosing device 10 will not be affected by the ambient pressure during the transfer of the implement 6. Furthermore, this arrangement will make it possible to perform a pressure test of the vessel 1 with a high internal pressure in the fluid receiving space 2 and in the inner space 50 of the buffer tank 51 when the closing member 41 is open and the enclosing device 10 is in the open position. Thus, the closing member 41 does not have to be dimensioned to withstand the test pressure.

In the embodiment illustrated in FIGS. 12 and 13, a tool 52 is arranged in the buffer tank 51 in order to actuate the closing member 41 between its closed position (see FIG. 12) and its open position (see FIG. 13). Furthermore, a conveying device 53 is arranged in the buffer tank. This conveying device 53 includes a gripping member 54, which can be moved into the closed space 12 inside the enclosing device 10 via the access opening 40 in order to grip the implement 6 and haul it out of the closed space and into the inner space 50 of the buffer tank. Furthermore, the buffer tank 51 is provided with a hatch 55, which can be opened when the access opening 40 has been closed by the closing member 41 so as to allow access to the inner space 50 of the buffer tank, for instance in order to remove or treat an implement received in the inner space and/or insert a new implement therein. When a previously removed implement 6 has been returned into the closed space 12 inside the enclosing device 10 or a new implement has been inserted therein by means of the conveying device 53, the access opening 40 is closed by means of the closing member 41, whereupon the enclosing device 10 is returned to the open position so as to allow the implement 6 to be put into operation.

The buffer tank 51 may be permanently or detachably secured to the vessel 1.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A vessel having an implement located in a fluid receiving space inside the vessel, the vessel comprising:
   an enclosure for enclosing a closed space around the implement; and
   an actuator for actuating the enclosure to and fro between an open position, in which the enclosure does not enclose a closed space around the implement, and a closed position, in which the enclosure forms a fluid tight or at least essentially fluid tight casing that encloses a closed space around the implement so as to prevent fluid in the fluid receiving space outside said closed space from flowing into the closed space,
   wherein the enclosure comprises a telescopically extendable cylinder, which is in a contracted state when the enclosure is in the open position and in an extended state when the enclosure is in the closed position.

2. The vessel according to claim 1, further comprising:
   a fluid supply for supplying a desired fluid into said closed space; and
   fluid discharging means for discharging fluid out of said closed space.

3. The vessel according to claim 2, wherein the fluid supply is connected to an external fluid source so as to supply fluid into said closed space from the external fluid source.

4. The vessel according to claim 1, wherein the enclosure is fixed to an upper wall of the fluid receiving space and arranged to be extended from this upper wall downwards through the fluid receiving space when actuated from the open position to the closed position.

5. The vessel according to claim 4, wherein the enclosure comprises a rim at its lower end, the vessel further comprising:
   a socket fixed to a bottom wall of the fluid receiving space under the enclosure, the socket comprising a beveled surface that forms a mating surface for said rim of the enclosure when the enclosure is in the closed position so as to allow said rim of the enclosure to abut against said mating surface of the socket in a fluid tight or at least essentially fluid tight manner when the enclosure is in the closed position.

6. The vessel according to claim 5, wherein the socket comprises a truncated cone.

7. The vessel according to claim 1, wherein the vessel comprises a tank having an open top, and wherein the enclosure is fixed to a bottom wall of the fluid receiving space and arranged to be extended from this bottom wall upwards through the fluid receiving space when actuated from the open position to the closed position.

8. The vessel according to claim 1, wherein the vessel comprises a closable access opening arranged in a wall of the fluid receiving space, through which access opening the implement is accessible when the enclosing device is in the closed position.

9. The vessel according to claim 1, wherein the implement comprises a measuring or detecting instrument, a valve, a pump, a motor or an electrostatic device.

10. The vessel according to claim 1, wherein the vessel comprises a separator tank, a pipe or a pipe section.

11. A vessel having an implement located in a fluid receiving space inside the vessel, the vessel comprising:
   an enclosure for enclosing a closed space around the implement; and
   an actuator for actuating the enclosure to and fro between an open position, in which the enclosure does not enclose a closed space around the implement, and a closed position, in which the enclosure forms a fluid tight or at least essentially fluid tight casing that encloses a closed space around the implement so as to prevent fluid in the fluid receiving space outside said closed space from flowing into the closed space, wherein the casing, which is formed by the enclosure when in the closed position, extends between two opposite walls of the fluid receiving space and surrounds said implement.

* * * * *